US006613845B1

(12) United States Patent
Naga et al.

(10) Patent No.: US 6,613,845 B1
(45) Date of Patent: Sep. 2, 2003

(54) PROPYLENE/ETHYLENE-α-OLEFIN BLOCK COPOLYMER AND PROCESS FOR PRODUCING THE SAME

(75) Inventors: Naofumi Naga, Ichihara (JP); Yoshiaki Oobayashi, Ichihiara (JP); Masatada Tasaka, Ichihara (JP); Kouji Mizunuma, Kisarazu (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/337,502

(22) Filed: Jun. 22, 1999

Related U.S. Application Data

(62) Division of application No. 08/863,395, filed on May 27, 1997, now Pat. No. 5,990,242.

(30) Foreign Application Priority Data

May 27, 1996 (JP) ............................................. 8-132088
Jun. 3, 1996 (JP) ............................................. 8-140240

(51) Int. Cl.$^7$ ............................................. C08F 293/00
(52) U.S. Cl. ........................................ 525/323; 526/79
(58) Field of Search .................... 525/95, 323; 526/79

(56) References Cited

U.S. PATENT DOCUMENTS

| | | |
|---|---|---|
| 4,454,306 A | 6/1984 | Fujii |
| 4,489,195 A | 12/1984 | Saeda |
| 5,232,993 A | 8/1993 | Winter |
| 5,280,074 A | 1/1994 | Schreck |
| 5,391,618 A | 2/1995 | Yamamoto |
| 5,541,260 A | 7/1996 | Pelliconi |
| 5,684,099 A | 11/1997 | Watanabe |
| 5,840,808 A | 11/1998 | Sugimura |

FOREIGN PATENT DOCUMENTS

| | | |
|---|---|---|
| EP | 0 395 055 | 10/1990 |
| EP | 0 708 146 | 4/1996 |

OTHER PUBLICATIONS

JP 4–345644 A (Mitsui Toatsu Chem Inc) Dec. 1, 1992 (abstract), retrieved on Jun. 25, 1999, retrieved from EPO, WPI, and PAJ Databases, WPI and PAJ abstracts.

JP 5–098122 A (Mitsui Toatsu Chem Inc) Apr. 20, 1993 (abstract), retrieved on Jun. 25, 1999, retrieved from EPO, WPI and PAJ Databases, WPI and PAJ abstracts.

Ewen et al, "Crystal Structures and Sterospecific Propylene Polymerizations with Chiral Hafnium Metallocene Catalysts", J. Am. Chem. Soc., 109, (1987), pp. 6544–6545.

Mise et al,, " Excellent Steroregular Isotactic Polymerizations of Propylene with C2—Symmetric Silylene–Bridged Metallocene Catalysts", Chemistry Letters, (1989), pp. 1853–1856.

Spaleck et al. "High Molecular Weight Polypropylene Through Specifically Designed Zirconocene Catalysts", Angew. Chem. Int. Ed. Engl., 31, (1992), pp. 1347–1350.

Grassi et al., "Microstructure of Isotacitc Polypropylene Prepared with Homogeneous Catalysis: Stereoregularity, Reioregularity, and 1,3–Insertion", Macromolecules, 21, (1988), pp. 617–622.

Spaleck et al., "The Influence of Aromatic Substituents on the Polymerization Behavior of Bridged Zirconocene Catalysts", Organometallics, 13 (1994), pp. 954–963.

Kakugo et al., "13C NMR Determination of Monomer Sequence Distribution in Ethylene–Propylene Copolymers Prepared with •—TiCl3—Al(C2H5)2Cl", Macromolecules, 15, (1982) pp. 1150–1152.

Zhang et al., "DSC and 13C NMR studies of ethylene–propene copolymers prepared by a highly active and stereospecific catalyst", Macromol. Chem. Phys. 195, (1994), pp1063–1073.

Ray et al., "Carbon–13 Nuclear Magnetic Resonance Determination of Monomer Composition and Sequence Distributions in Ethylene–Propylene Copolymers Prepared with a Stereoregular Catalyst System", Macromolecules, vol. 10, No. 4, (Jul.–Aug. 1977), pp 773–778.

(List continued on next page.)

Primary Examiner—Jeffrey Mullis
(74) Attorney, Agent, or Firm—Fitch, Even, Tabin & Flannery

(57) ABSTRACT

A propylene/ethylene-α-olefin block copolymer obtained by block-copolymerizing a polypropylene component with an ethylene-α-olefin random copolymer component, which satisfies conditions of the following terms (I) to (III):

(I) the content of the polypropylene component having an intrinsic viscosity ([η]) measured in tetralin at 135° C. of from 0.5 to 5.0 dl/g is from 5 to 95% by weight;

(II) the content of the α-olefin in the random copolymer component is from 5 to 40 mol %, and the content of the ethylene-α-olefin random copolymer component whose ρ value represented by the following equation:

$$\rho = 2[E][A]/[EA]$$

(wherein [E] represents a molar fraction of ethylene, [A] represents a molar fraction of the α-olefin and [EA] represents a molar fraction of a diad chain of ethylene and the α-olefin) is within the range from 0.5 to 1.5 is from 5 to 95% by weight; and (III) the intrinsic viscosity ([η]) of the propylene/ethylene-α-olefin block copolymer measured in tetralin at 135° C. is from 0.5 to 5.0 dl/g, and a process for producing the above propylene/ethylene-α-olefin block copolymer.

7 Claims, No Drawings

OTHER PUBLICATIONS

Zambelli et al., "Copolymerization of ethylene with propene in the presence of homogeneous catalytic systems based on Group 4 metallocenes and methylalumoxane: implications of the reactivity ratios on the reaction mechanism", Makromol. Chem. Rapidcommun., 12, (1991), pp. 523–528.

Rossi et al., "Microstructure of Ethylene–1–Butene Copolymers Produced by Zirconocene/Methylaluminoxane Catalysis", Macromolecules, vol. 29, No. 7, (1996), pp. 2331–2338.

Quijada et al., "Synthesis and characterization of ethylene–1–hexene copolymers using homogeneous Ziegler–Natta catalysts", Polymer Bulletin, 35, (1995), pp. 299–306.

Koivumaki et al., "Copolymerization of Ethene and Propene In Liquid propene with MgCl2/TiCl4, VOCl4, VOCl3 and Cp2ZrCl2 Catalyst Systems—A Comparison Of Products", Eur. Polym. J., vol. 30, No. 10, (1994), pp. 1111–1115.

Brintzinger et al., "Stereospecific Olefin Polymerization with Chiral Metallocene Catalyst", Angew. Chem. Int. Ed. Engl., 34, (1995), pp1143–1170.

PROPYLENE/ETHYLENE-α-OLEFIN BLOCK COPOLYMER AND PROCESS FOR PRODUCING THE SAME

This is a division of application Ser. No. 08/863,395, filed May 27, 1997 now U.S. Pat. No. 5,990,242.

BACKGROUND OF THE INVENTION

1. Field of the Invention

The present invention relates to a propylene/ethylene-α-olefin block copolymer which is superior in impact resistance and processability. In the present invention, the propylene/ethylene-α-olefin block copolymer means a polymer obtained by successively synthesizing a propylene polymer component and an ethylene-α-olefin copolymer component. However, this block copolymer is not a true block copolymer with which said components (moieties) are perfectly chemically bonded each other, but is a kind of polymer compositions.

2. Description of the Related Arts

Polypropylene has widely been used for various purposes because of excellent physical properties. For example, polypropylene has recently been used for various purposes such as automobile interior/exterior parts, electrical parts, etc. because of excellent rigidity, heat resistance, gloss and moldability as well as low price. However, there was a problem that polypropylene is insufficient in impact resistance because of the crystallizability and, therefore, the use thereof is limited.

In order to improve the impact resistance of propylene, a process of polymerizing propylene with ethylene or the other olefin stepwise to form a block copolymer has hitherto been used. In the production of a block copolymer of conventional stereoregular polypropylene, a titanium trichloride catalyst or a titanium-magnesium composite catalyst is exclusively used. These catalysts normally have low randomness in the copolymerization reaction and wide composition distribution. Therefore, even if a rubber-like copolymer is produced at the second-stage after crystalline polypropylene was produced at the first-stage, the impact resistance is sometimes insufficient in a specific use.

As a method of improving the non-homogeneity of the rubber-like copolymer moiety, there is disclosed a method of producing a propylene/ethylene-propylene block copolymer or a block copolymer of propylene/propylene and at least one of ethylene and an α-olefin having 4 to 20 carbon atoms, using an uniform catalyst such as metallocene, which produces a homogeneous copolymer having large randomness (Japanese Patent Kokai Nos. 5-202152 and 6-172414). However, when using the above copolymer as the rubber-like copolymer moiety, the impact resistance is improved but the rigidity as an intrinsic characteristic of polypropylene is liable to be drastically deteriorated.

On the other hand, as a method of maintaining the rigidity to high level with improving the impact resistance of polypropylene, there has been used a method of blending polypropylene with a rubber-like substance having large randomness and narrow composition distribution, such as ethylene-propylene copolymer rubber (EPR), ethylene-butene copolymer rubber (EBR), ethylene-propylene-diene copolymer rubber (EPDM), etc. Although these rubber-like substances are normally produced with a vanadium catalyst system, there has recently been disclosed an improvement accomplished by blending an ethylene-higher α-olefin copolymer rubber (α-olefin having 4 to 8 carbon atoms) with an uniform catalyst system such as metallocene catalyst system (Japanese Patent Kokai Nos. 6-192500, 6-192506, 6-248156 and 7-102126). However, there arises a problem in blending operation that such a rubber-like copolymer can not be used after pelletizing, like a crystalline resin, because the shape thereof is not easily handled according to the composition. Besides, with respect to a method of blending such a rubber-like copolymer, an operation of blending is required and a kinds of the rubber-like copolymers is expensive.

There is also disclosed a technique about a thermoplastic elastomer which is superior in moldability by means of olefin block copolymerization (Japanese Patent Kokai (laid-open) Nos. 57-61012, 58-32616, 58-71910, 58-103548, 59-105008 and 1-297408). In the production of these olefin block copolymers, a titanium trichloride catalyst system or a titanium-magnesium composite catalyst system is mainly used. However, the mechanical properties such as impact resistance is sometimes insufficient in a specific use. Furthermore, when using the catalyst, relative reactivity of α-olefin to ethylene tends to be markedly lowered depending upon the increase of the number of carbon atoms of the α-olefin in view of the property of the catalyst.

SUMMARY OF THE INVENTION

An object of the present invention is to provide an olefin block copolymer which is superior in impact resistance and rigidity without blending a rubber-like copolymer having excellent randomness and narrow composition distribution, and a process for producing the same.

Another object of the present invention is to provide an olefin block copolymer which is superior in balance between the impact resistance and rigidity.

Still another object of the present invention is to provide an olefin block copolymer which is superior in heat resistance, impact resistance and processability, and has a noticeable effect for improving physical properties of polypropylene when adding it to polypropylene.

The present inventors have intensively studied so as to accomplish the above objects. As a result, the present invention has been completed.

According to the present invention, there is provided a propylene/ethylene-α-olefin block copolymer obtained by polymerizing propylene to form a polypropylene component in a first-stage and copolymerizing an ethylene and α-olefin having 4 to 18 carbon atoms to form a random copolymer component in a second-stage, which satisfies the following conditions (I) to (III):

(I) a content of the polypropylene component(1) having an intrinsic viscosity ([η]) measured in tetralin at 135° C. of from 0.5 to 5.0 dl/g is from 5 to 95% by weight;

(II) a content of an α-olefin in the random copolymer component(2) is from 5 to 40 mol %, and a content of the ethylene-α-olefin random copolymer component having a ρ value represented by the following general formula:

$$\rho = 2[E][A]/[EA]$$

(wherein [E] represents a molar fraction of ethylene, [A] represents a molar fraction of the α-olefin and [EA] represents a molar fraction of a dyad chain of ethylene and the α-olefin) within the range from 0.5 to 1.5 is from 5 to 95% by weight; and (III) an intrinsic viscosity ([η]) of the propylene/ethylene-α-olefin block copolymer measured in tetralin at 135° C. is from 0.5 to 5.0 dl/g.

The present invention also provides a propylene/ethylene-α-olefin block copolymer wherein the content of the component (1) is from 50 to 95% by weight and the amount of the component (2) is from 5 to 50% by weight.

Furthermore, the present invention also provide a propylene/ethylene-α-olefin block copolymer wherein the content of the component (1) is not less than 5% by weight and less than 50% by weight and the amount of the component (2) is more than 50% by weight and not more than 95% by weight.

Furthermore, the present invention provide a process for producing the above-described copolymers and a molded article therefrom.

DETAILED DESCRIPTION OF THE INVENTION

The present invention will be explained in detail below.

The propylene/ethylene-α-olefin block copolymer of the present invention is composed of the polypropylene component and the ethylene-α-olefin random copolymer component and obtained by producing a polypropylene component in the first-stage of polymerization and an ethylene-α-olefin random copolymer component in the second-stage of the polymerization. The α-olefin used in the present invention is an α-olefin having 4 to 18 carbon atoms, preferably 4 to 8 carbon atoms. Particularly, 1-butene, 1-hexene and 1-octene are preferably used. The content of the polypropylene component in the propylene/ethylene-α-olefin block copolymer is within the range from 5 to 95% by weight, and the content of the ethylene-α-olefin random copolymer component is within the range from 5 to 95% by weight. Each content may be changed within the wide range. However, when the content of polypropylene component is less than 5% by weight, the processability is deteriorated. On the other hand, when it exceeds 95% by weight, the effect of improving the impact resistance becomes poor.

A preferred range of the proportion of the polypropylene component to the ethylene-α-olefin copolymer in the propylene/ethylene-α-olefin block copolymer of the present invention can be selected from the above range according to the desired purpose. When using for the purpose to which the impact resistance is required, in addition to the processability, the content of the polypropylene component in the propylene/ethylene-α-olefin block copolymer is preferably not less than 5% by weight and less than 50% by weight, and the content of the ethylene-α-olefin random copolymer is preferably more than 50% by weight and not more than 95% by weight. In this case, the impact resistance is further enhanced by increasing the content of the ethylene-α-olefin random copolymer component in the propylene/ethylene-α-olefin block copolymer to more than 50% by weight.

In the use to which physical properties superior in balance between the impact resistance and rigidity are required, the content of the polypropylene component in the propylene/ethylene-α-olefin block copolymer is preferably from 50 to 95% by weight, and the content of the ethylene-α-olefin random copolymer component is preferably within the range from 5 to 50% by weight. There can be obtained those having physical properties, which is superior in balance between the impact resistance and rigidity, by increasing the content of the polypropylene component to 50% by weight or more.

The content of the α-olefin in the ethylene-α-olefin random copolymer component is from 5 to 40 mol %. When the content of the α-olefin is less than 5 mol %, the effect of improving the impact resistance becomes poor. On the other hand, when it exceeds 40 mol %, the processability is deteriorated. Particularly, when the content of the polypropylene component is not less than 50% by weight, the rigidity unfavorably decreases in addition to deterioration of the processability.

When the polypropylene component of the propylene/ethylene-α-olefin block copolymer of the present invention is produced, a small amount of ethylene or the α-olefin (preferably not more than 10 mol %) other than propylene can be copolymerized as far as the object of the present invention is not adversely affected. When the ethylene-α-olefin random copolymer component is produced, a small amount of propylene or the other α-olefin (preferably not more than 3% by weight) can be copolymerized as far as the object of the present invention is not adversely affected.

The ethylene-α-olefin random copolymer component in the present invention has a ρ value represented by the following general formula:

$$\rho = 2[E][A]/[EA]$$

(wherein [E] represents a molar fraction of ethylene, [A] represents a molar fraction of α-olefin and [EA] represents a molar fraction of a dyad chain of ethylene and an α-olefin) within the range from 0.5 to 1.5.

In the ethylene-α-olefin random copolymer component of the present invention, this ρ value is an index which represents a distribution state of each monomer constituting a random copolymer chain. When the ρ value is closer to 1, little blocked chain is formed and the resulting copolymer is a copolymer having large randomness and narrow composition distribution. That is, the larger the randomness of the ethylene-α-olefin random copolymer, the larger the effect of improving the impact resistance of polypropylene.

The polypropylene component in the propylene/ethylene-α-olefin block copolymer of the present invention, has an intrinsic viscosity ([η]) measured in tetralin at 135° C. of from 0.5 to 5.0 dl/g, preferably from 0.5 to 3.0 dl/g, more preferably from 0.8 to 2.0 dl/g, and the intrinsic viscosity can optionally be changed within the above range according to the desired purpose.

The ethylene-α-olefin random copolymer in the propylene/ethylene-α-olefin block copolymer of the present invention has an intrinsic viscosity ([η]) measured in tetralin at 135° C. of from 0.5 to 5.0 dl/g. When the content of the polypropylene component is within the range from 50 to 95% by weight, the intrinsic viscosity is preferably from 0.5 to 3.0 dl/g. When the content of the polypropylene component is not less than 5% by weight and less than 50% by weight, the intrinsic viscosity is preferably from 1.0 to 3.0 dl/g. Further, the intrinsic viscosity can optionally be changed within the above range according to the desired purpose. However, when [η] is less than 0.5 dl/g, the stickiness sometimes appear. On the other hand, when it exceeds 5.0 dl/g, the flowability becomes poor. In both cases, the moldability is unfavorably deteriorated.

The propylene/ethylene-α-olefin block copolymer of the present invention can be produced by using a homogenous transition metal complex catalyst, that is, a catalyst containing a combination of (A) a compound of transition metal of Group IV of the Periodic Table, having a cyclopentadienyl ring and (B) at least one selected from the group consisting of (i) aluminoxanes, (ii) compounds which reacts with the transition metal compound to form an stable anion and (iii) organoaluminum compounds, as essential components.

As the transition metal compound having a cyclopentadienyl ring, there can be preferably used a compound wherein a cycloalkadienyl group or a substituted group thereof is coordinated on the metal. Specifically, there can be used a zirconium or hafnium compound containing, as a ligand, a multi-coordination compound wherein at least two groups selected from the group consisting of indenyl group, substituted indenyl group and a partially hydrogenated group thereof are bonded through a lower alkylene group.

Examples of the transition metal compound (A) include stereorigid chiral compounds of zirconium and hafnium, such as ethylenebis(indenyl)zirconium dichloride described in H. H. Brinzinger et al., J. Organometal. Chem., 288, 63 (1985), ethylenebis(indenyl)hafnium dichloride described in J. Am. Chem. Soc., 109, 6544 (1987), dimethylsilylenebis (methylcyclopentadienyl)zirconium dichloride described in H. Yamazaki et al., Chemistry Letters, 1853(1989), dimethylsilylenebis(1-indenyl)zirconium dichloride described in W. Spaleck et al., Angew. Chem. Int. Ed. Engl., 31, 1347 (1992) and the like.

Specific examples thereof include ethylenebis(1-indenyl) zirconium dichloride, ethylenebis(4,5,6,7-tetrahydro-1-indenyl)zirconium dichloride, ethylenebis(2methyl-1-indenyl)zirconium dichloride, ethylenebis(3-methyl-1-indenyl)zirconium dichloride, ethylenebis(4-methyl-1-indenyl)zirconium dichloride, ethylenebis(5-methyl-1-indenyl)zirconium dichloride, ethylenebis(6-methyl-1-indenyl)zirconium dichloride, ethylenebis(7-methyl-1-indenyl)zirconium dichloride, ethylenebis(2,3-dimethyl-1-indenyl)zirconium dichloride, ethylenebis(4,7-dimethyl-1-indenyl)zirconium dichloride, ethylenebis(2,4,7-trimethyl-1-indenyl)zirconium dichloride, dimethysilylbis (methylcyclopentadienyl)zirconium dichloride, dimethysilylbis(tbutylcyclopentadienyl)zirconium dichloride, dimethysilylbis(dimethylcyclopentadienyl) zirconium dichloride, dimethysilylbis (trimethylcyclopentadienyl)zirconium dichloride, dimethysilyl(methylcyclopentadienyl) (dimethylcyclopentadienyl)zirconium dichloride, dimethysilylbis(methylcyclopentadienyl)(t-butylcyclopentadienyl)zirconium dichloride, dimethysilylbis(1-indenyl)zirconium dichloride, dimethysilylbis(4,5,6,7-tetarhydroindenyl)zirconium dichloride, dimethysilylbis(2-methyl-1-indenyl)zirconium dichloride, dimethysilylbis(3-methyl-1-indenyl)zirconium dichloride, dimethysilylbis(4-methyl-1-indenyl)zirconium dichloride, dimethysilylbis(5-methyl-1-indenyl)zirconium dichloride, dimethysilylbis(6-methyl-1-indenyl)zirconium dichloride, dimethysilylbis(7-methyl-1-indenyl)zirconium dichloride, dimethysilylbis(2,3-dimethyl-1-indenyl) zirconium dichloride, dimethysilylbis(4,7-dimethyl-1indenyl)zirconium dichloride, dimethysilylbis(2,4,7-trimethyl-1-indenyl)zirconium dichloride, dimethysilylbis (2-methyl-4-isopropyl-1indenyl)zirconium dichloride, dimethysilylbis(4,5-benz-1-indenyl)zirconium dichloride, dimethysilylbis(2-methyl-4,5-benz-1-indenyl)zirconium dichloride, dimethysilylbis(4-phenyl-1-indenyl)zirconium dichloride, dimethysilylbis(2-methyl-5-phenyl-1-indenyl) zirconium dichloride, dimethysilylbis(2-methyl-4-phenyl-1indenyl)zirconium dichloride, dimethysilylbis(2-methyl-4naphthyl-1-indenyl)zirconium dichloride, isopropyl(3-tbutyl-cyclopentadienyl)(3-t-butyl-indenyl)zirconium dichloride, isopropyl(3-t-butyl-cyclopentadienyl)(3-methyl-indenyl)zirconium dichloride, ethylenebis(1-indenyl) hafnium dichloride, ethylenebis(4,5,6,7-tetrahydro-1-indenyl)hafnium dichloride, ethylenebis(2methyl-1-indenyl)hafnium dichloride, ethylenebis(3-methyl-1-indenyl)hafnium dichloride, ethylenebis(4-methyl-1-indenyl)hafnium dichloride, ethylenebis(5-methyl-1-indenyl)hafnium dichloride, ethylenebis(6-methyl-1-indenyl)hafnium dichloride, ethylenebis(7-methyl-1-indenyl)hafnium dichloride, ethylenebis(2,3-dimethyl-1-indenyl)hafnium dichloride, ethylenebis(4,7-dimethyl-1-indenyl)hafnium dichloride, ethylenebis(2,4,7-trimethyl-1-indenyl)hafnium dichloride, dimethysilylbis (methylcyclopentadienyl)hafnium dichloride, dimethysilylbis(t-butylcyclopentadienyl)hafnium dichloride, dimethysilylbis(dimethylcyclopentadienyl) hafnium dichloride, dimethysilylbis (trimethylcyclopentadienyl)hafnium dichloride, dimethysilyl(methylcyclopentadienyl) (dimethylcyclopentadienyl)hafnium dichloride, dimethysilylbis(methylcyclopentadienyl)(t-butylcyclopentadienyl hafnium dichloride, dimethysilylbis (1-indenyl)hafnium dichloride, dimethysilylbis (4,5,6,7-tetarhydroindenyl)hafnium dichioride, dimethysilylbis(2-methyl-1-indenyl)hafnium dichoride, dimethysilylbis(3-methyl-indenyl)hafnium dichloride, dimethysilylbis(4-methyl-1-indenyl)hafnium dichloride, dimethysilylbis(5-methyl-1-indenyl)hafnium dichloride, dimethysilylbis(6-methyl-1-indenyl)hafnium dichloride, dimethysilylbis(7-methyl-1-indenyl)hafnium dichloride, dimethysilylbis (2,3-dimethyl-1-indenyl)hafnium dichloride, dimethysilylbis(4,7-dimethyl-1-indenyl)hafnium dichloride, dimethysilylbis (2,4,7-trimethyl-1-indenyl)hafnium dichloride, dimethysilylbis(2-methyl-4-isopropyl-1-indenyl)hafnium dichloride, dimethysilylbis(4,5-benz-1-indenyl)hafnium dichloride, dimethysilylbis(2-methyl-4,5-benz-1-indenyl) hafnium dichloride, dimethysilylbis(4-phenyl-1-indenyl) hafnium dichloride, dimethysilylbis(2methyl-5-phenyl-1-indenyl)hafnium dichloride, dimethysilylbis(2-methyl-4-phenyl-1-indenyl)hafnium dichloride, dimethysilylbis(2-methyl-4-naphthyl-1indenyl)hafnium dichloride, isopropyl (3-t-butylcyclopentadienyl)(3-t-butyl-indenyl)hafnium dichloride, isopropyl(3-t-butyl-cyclopentadienyl)(3-methyl-indenyl)hafnium dichloride, and dimethyl compounds of which chlorine of these dichloride compounds above is substituted with methyl.

Furthermore, there may. be used a transition metal compound having one multidentate ligand mentioned above. Examples thereof include compounds such as dimethylsilyl (fluorenyl)(t-butylamino)zirconium dichloride, dimethylsilyl(fluorenyl)(t-butylamino)hafnium dichloride and the like.

As the aluminoxane (B) (i), there can be used those obtained by condensing one or more kinds of trialkylaluminums with water. Specific examples thereof include methylaluminoxane, ethylaluminoxane, propylaluminoxane, butylaluminoxane, isobutylaluminoxane, methylethylaluminoxane, methylbutylaluminoxane, methylisobutylaluminoxane and the like. Particularly, methylaluminoxane and methylisobutylaluminoxane are preferably used.

The amount of the aluminoxane used can be selected within the wide range as 1 to 10000 mol per 1 mol of a transition metal atom. Preferably, it is within the range from 100 to 3000 mol per 1 mol of a transition metal atom.

As the compound which reacts with the transition metal compound to form a stable anion, there can preferably be used tetrakis(pentafluorophenyl)borate- or tetarkis (pentafluorophenyl)aluminate-containing compounds, such as triphenylcarbonium tetrakis(pentafluorophenyl)borate, N,N-dimethylanilinium tetarkis(pentafluorophenyl)borate, triphenylcarbonium tetrakis(pentafluorophenyl)aluminate and the like, and tris(pentafluorophenyl)borane.

The organoaluminum compound (B) (iii) used in the present invention has at least one Al—C bond in the molecule, and is preferably represented by the following formula:

$$AlR_nX_{3-n}$$

(wherein R represents a hydrocarbon group having 1 to 20 carbon atoms, X represents halogen or hydrogen, and n represents a numeral satisfying the expression: $0<n\leq3$). Specific examples of R include alkyl group having 1 to 20 (preferably 1 to 8) carbon atoms, such as methyl, ethyl, propyl, isopropyl, butyl, iso-butyl, t-butyl, pentyl, hexyl, heptyl, octyl, etc.; aralkyl group having 1 to 20 (preferably up to 8) carbon atoms, such as benzyl, 4-methylbenzyl, etc.; and aryl group having 1 to 20 (preferably up to 8) carbon atoms, such as phenyl, etc. Examples of X include chlorine, bromine, iodine and hydrogen atoms. n is preferably 3.

Specific examples of the organoaluminum compound include trimethylaluminum, triethylaluminum, tripropylaluminum, tributylaluminum, tri-iso-butylaluminum, tri-t-butylaluminum, triisopropylaluminum, tripentylaluminum, trilhexylaluminum, tri(2methylpentyl) aluminum, trioctylaluminum, diethyl aluminum hydride, diisobutylaluminum hydride, methylaluminum sesquichloride, ethylaluminum sesquichloride, isobutylaluminum sesquichloride, dimethylaluminum chloride, diethylaluminum chloride, dipropylaluminum chloride, dibutylaluminum chloride, diisobutylaluminum chloride, di-t-butylaluminum chloride, diisopropylaluminum chloride, dipentylaluminum chloride, methylaluminum dichloride, ethylaluminum dichloride, isobutylaluminum dichloride, t-butylaluminum dichloride, isopropylaluminum dichloride, pentylaluminum dichloride and the like.

Among the above organoaluminum compounds, triethylaluminum and triisobutylaluminum are preferably used.

The amount of the organoaluminum compound used can normally be selected within the wide range, e.g. 1 to 10000 mol, preferably within the range from 1 to 1000 mol, per 1 mol of the transition metal atom in the transition metal compound (A).

The feedings of the respective catalyst components in a polymerization reactor, are carried out, for example, in water-free state in an inert gas (e.g. nitrogen, argon, etc.) in the presence of a monomer. The catalyst components (A) and (B) may be fed separately, or may be fed after previously contacting each other.

The polymerization temperature is usually within the range from −30 to 300° C., preferably from 0 to 280° C., more preferably from 20 to 250° C.

The polymerization pressure is not specifically limited, but is preferably from normal pressure to about 5 atm. in view of industrial economical efficiency. The polymerization time is appropriately selected considering the kind of the desired polymer and reaction apparatus, but is usually within the range from 5 minutes to 40 hours.

A continuous or batch-wise polymerization process may be used. It is also possible to conduct slurry polymerization or solvent polymerization in an inert hydrocarbon solvent (e.g. propane, pentane, hexane, heptane, octane, etc.), bulk polymerization in a liquefied monomer (e.g. propylene, etc.), or gas phase polymerization.

It is also possible to add a chain transfer agent such as hydrogen, etc. in order to adjust the molecular weight of the propylene/ethylene-α-olefin block copolymer of the present invention.

In the production of the propylene/ethylene-α-olefin block copolymer of the present invention, the order of synthesizing the polypropylene component and ethylene-α-olefin random copolymer component is not specifically limited, but it is preferred that propylene is polymerized in the first-stage in the presence of a catalyst, and then ethylene-α-olefin random copolymerization is conducted in the second-stage in the presence of the polypropylene component formed in the first-stage.

There may be added various additives such as heat stabilizers, antioxidants, weathering stabilizers, releasants, slip agents, colorants, antistatic agents, etc. to the propylene/ethylene-α-olefin block copolymer of the present invention as far as the object of the present invention is not adversely affected, in order to maintain the processing stability. There may optionally be added nucleating agents or inorganic fillers (e.g. calcium carbonate, talc, mica, silica, etc.). Furthermore, it is also possible to blend the propylene/ethylene-α-olefin block copolymer of the present invention with a resin such as an olefin resin (e.g. another propylene polymer, an ethylene polymer, polybutene, etc.), an acrylonitrile-butadiene-styrene copolymer resin or a rubber such as a styrene rubber (e.g. styrene/ethylene-butene/styrene block copolymer, etc.).

The propylene/ethylene-α-olefin block copolymer of the present invention can be molded into various molded articles such as sheet, film, bottle, etc. by adding additives described above, optionally blending fillers and various resins or rubbers, melt-kneading using an extruder, a Banbury mixer, a kneader blender, etc. to form pellets, followed by molding according to an injection molding, extrusion molding or blow molding. The propylene/ethylene-α-olefin block copolymer of the present invention can be used for various purposes because of excellent mechanical characteristics such as impact resistance, etc. For example, it is possible to be use for purposes such as part for electrical apparatus, automobile interior/exterior part, vessel for detergent and the like. Further, there may be used the propylene/ethylene-α-olefin block copolymer especially having a polypropylene component content of not less than 5% by weight and less than 50% by weight of the present invention as a modifier for improving an impact strength of a polyolefin resin such as a polypropylene by adding to the polyolefin resin.

The following Examples further illustrate the present invention in detail but are not to be construed to limit the scope thereof.

Measured values of the respective items in the Examples were determined by the following methods.

(1) Stereoregularity

It was determined by the $^{13}$C-nuclear magnetic resonance spectrum method. $^{13}$C-NMR of the polymer was determined by measuring a solution, prepared by dissolving about 150 mg of the polymer in 3 ml of ortho-dichlorobenzene, in a test tube of 10 mmφ under the conditions of a measuring temperature of 135° C., a measuring frequency of 67.8 MHz, a spectral width of 3000 Hz, a filter width of 100000 Hz, a pulse repeating time of 10 seconds, a pulse width of 45° and an integrating times of 5000 to 7000.

(2) Content of Ethylene-α-olefin Random Copolymer and α-olefin Content and ρ Value 1̂ Quantitative determination of content of ethylene-1-butene random copolymer component, ethylene-1-hexene random copolymer component and ethylene-1-octene random copolymer component, and α-olefin content They were determined by the $^{13}$C-nuclear magnetic resonance spectrum method described in James. C. Randall, Sci., Macromol. Chem. Phys., C29 (2∈3), 29,201–317 (1989).

The measurement of $^{13}$C-NMR of the polymer was conducted according to the same manner as that described in the above item (1).

2 Content of ethylene-propylene random copolymer component

The quantitative determination (% by weight) of the ethylene-propylene copolymer component was conducted by measuring each heat of fusion a whole propylene/ethylene-propylene block copolymer and a polypropylene component, followed by calculating using the following equation.

The crystal melting heat quantity was determined by previously melting 10 mg of a sample under a nitrogen atmosphere at 220° C. for 5 minutes using a differential scanning calorimeter (manufactured by Perkin Elmer Co., DSC), cooling to 50° C. at a cooling rate of 130° C./minute to crystallize the molten sample, heating to 180° C. at a heating rate of 16° C./minute, and calculating from the resulting melting-endothermic curve.

$$X=\{1-(\Delta Hf)_T/(\Delta Hf)_P\}\times 100$$

wherein X is a content (% by weight) of an ethylene-propylene random copolymer component, $(\Delta Hf)_T$ is a melting heat quantity (cal/g) of a whole propylene/ethylene-propylene block copolymer and $(\Delta Hf)_P$ is a melting heat quantity (cal/g) of a polypropylene component.

3 ρ value of ethylene-α-olefin random copolymer component

It was determined by calculating from a molar fraction ([E]) of ethylene in an ethylene-α-olefin random copolymer component, a molar fraction ([A]) of an α-olefin and a molar fraction ([EA]) of a diad chain of ethylene and an α-olefin, determined by the $^{13}$C-nuclear magnetic resonance spectrum method described in James. C. Randall, Macromol. Chem. Phys., C29 (2ε3), 29, 201–317 (1989), according to the following general formula:

$$\rho=2[E]\cdot[A]/[E]$$

(3) Weight Average Molecular Weight (Mw), and Weight Average Molecular Weight/number Average Molecular Weight (MW/Mn)

The Mw was measured by gel permeation chromatography (GPC) under the following conditions. A calibration curve was made by using standard polystyrene.

Model: 150CV, manufactured by Millipore Water Co.

Column: Shodex M/S 80

Measuring temperature: 145° C., solvent: orthodichlorobenzene

Sample concentration: 5 mg/8 ml

Incidentally, Standard Reference Material 706 (polystyrene having Mw/Mn of 23.1) of NSB (National Bureau of Standard) was measured under above-described conditions. As a result, a molecular weight distribution (Mw/Mn) of 2.1 was obtained.

(4) Intrinsic Viscosity ([η]: dl/g)

It was measured in tetralin at 135° C.

(5) Melting Point (Tm: ° C.)

It was determined by previously melting 10 mg of a sample under a nitrogen atmosphere at 220° C. for 5 minutes using a differential scanning calorimeter (manufactured by Perkin Elmer Co., DSC), cooling to 50° C. at a cooling rate of 5° C./minute to crystallize the molten sample, heating at a heating rate of 10/minute, and determining a temperature of a maximum peak of the resulting melting-endothermic curve as the melting point.

(6) Density (g/cm$^3$)

The press molding and conditioning are conducted according to JIS K6758. The measurement was conducted after a lapse of 48 hours at 23° C. since molding. The measurement is conducted according to JIS K7112.

(7) Flexural Modulus (Kg/cm$^2$)

The press molding and conditioning are conducted according to JIS K6758. The measurement was conducted after a lapse of 48 hours at 23° C. since molding. The measurement is conducted according to JIS K7203.

(8) Izod Impact (Kg·cm/cm$^2$)

The press molding and conditioning are conducted according to JIS K6758. The measurement was conducted after a lapse of 48 hours at 23° C. since molding. In the measuring at a temperature of −20° C., the measurement was conducted after an additional lapse of 2 hours at −20° C. A sample with a V-shaped notch was measured by using an Izod impact tester (manufactured by Toyo Seiki Co., Ltd.) (JIS K7110).

(9) Melt Index (MI: g/10 minute)

It was measured with a melt indexer manufactured by Techno Seven Co., Ltd. under the conditions of a load of 2.16 kgf and a specific measuring temperature (a polypropylene resin: 230° C., an ethylene-α-olefin random copolymer: 190° C.) (JIS K7210).

As the transition metal compound (A) having a cyclopentadienyl ring of Group IV of the Periodic Table, the compound (B) (ii) which reacts with the transition metal to form a stable anion, and (B) (iii), the followings were used.

(A) Transition Metal Compound

As dimethylsilylbis(1-indenyl)hafnium dichloride, a commercially available product manufactured by Nippon Fine Chemical Co., Ltd. was used.

(B) (ii) Compound Which Reacts with the Transition Metal to form a Stable Anion

A commercially available product manufactured by Toso Akzo Co., Ltd., triphenylcarboniumtetrakis(pentafluorophenyl)borate was used.

(B) (iii) Organoaluminum Compound

A commercially available product manufactured by Toso Akzo Co., Ltd., triisobutylaluminum was used.

EXAMPLE 1

Polymerization (1) First-stage: Polymerization of Propylene

After the atmosphere of a stirring type stainless steel autoclave (1 liter) was replaced with nitrogen, 300 ml of purified toluene was charged and a hydrogen pressure of 50 mmHg was applied. Preparation for polymerization was conducted by saturating with a propylene gas of 4.0 kgf/cm$^2$ with heating to a polymerization temperature of 40° C.

On the other hand, after the atmosphere of a flask (100 ml) equipped with a magnetic stirrer was replaced with nitrogen, 10 ml of purified toluene, 0.95 mmol of triisobutylaluminum and 1.90 μmol of dimethylsilylbis(1-indenyl)hafnium dichloride were added under a nitrogen atmosphere and then mixed with stirring at room temperature for 5 minutes to prepare a catalyst solution. The molar ratio of [Al] to [Hf] of the catalyst solution was 500. This catalyst solution was charged into the autoclave with a pressure of propylene gas. After a purified toluene solution of triphenylcarboniumtetrakis(pentafluorophenyl)borate (molar ratio of it to dimethylsilylbis(1-indenyl)hafnium dichloride :1) was charged into the autoclave with a pressure of propylene gas, the polymerization was carried out at 40° C. for 60 minutes. During the polymerization, the propylene gas was continuously fed at 4.0 kgf/cm$^2$. The unreacted propylene gas was purged with stirring slowly and, after replacing the atmosphere with nitrogen, a small amount of the polymer was sampled. Furthermore, the pressure in the autoclave was reduced using a vacuum pump for about 1 minute.

(2) Second-stage: Ethylene-α-olefin Random Copolymerization

After 10 g of liquefied 1-butene was charged into the autoclave adjusted to 60° C. with a pressure of ethylene gas, the polymerization was continuously carried out for 90 minutes with continuously feeding an ethylene gas at 4.0 kgf/cm$^2$. Then, the polymerization was terminated by adding isobutanol of 15 ml with a pressure. The unreacted monomer gas was purged and contents of the autoclave were introduced in an about 4-fold amount of ethanol. Then, the deposited polymer was filtered and dried at 60° C. for about 4 hours to obtain a propylene/ethylene-1-butene block copolymer of 61.6 g. [η] of the resulting block copolymer was 1.43 dl/g and Mw/Mn thereof was 2.5. The intrinsic viscosity[η] of the polypropylene component was 0.98 dl/g and Mw/Mn thereof was 2.1. The content of the ethylene-α-olefin random copolymer component was 31.7% by weight and the content of 1-butene in the component was 6.6 mol % and, furthermore, the ρ value was 1.06. By the measurement of $^{13}$C-NMR, a signal derived from an ethylene-propylene chain [EP] was detected in the block copolymer, and 9.8 mol % of it was contained.

Press Molding and Evaluation of Physical Properties

To 100 parts by weight of the resulting propylene/ethylene-1-butene block copolymer, 0.2 part by weight of Sumilizer BHT (trade name) (manufactured by Sumitomo Chemical Co., Ltd., 2,6-di-t-butyl-p-cresol), 0.05 part by weight of Irganox 1010 (trade name) {manufactured by Ciba Geigy Limited, tetrakis[methylene-3-(3',5-di-tbutyl-4-hydroxyphenyl)propionate]methane} and 0.15 part by weight of calcium stearate were added. The resulting mixture was melt-kneaded under the conditions of a temperature of 180° C. and a revolution of 100 rpm for 5 minutes, using a Laboplastomill (trade name of a small-sized twin-screw kneader manufactured by Toyo Seiki Co., Ltd.,) and then cut into pieces to obtain pellets. The pellets were evaluated after press molding and conditioning according to JIS K6758. As a result, the density was 0.886 g/cm$^3$ and the flexural modulus was 4700 Kg/cm$^2$. Furthermore, the Izod impact was 9.6 Kg·cm/cm$^2$ at 23° C. and was 6.2 Kg·cm/cm$^2$ at −20° C. MI (230° C.) was 39.2 g/10 minutes.

EXAMPLE 2

Polymerization (1) First-stage: Polymerization of Propylene

The polymerization was carried out in the same manner as in Example 1 except that 1.94 μmol of dimethylsilylbis(1-indenyl)hafnium dichloride and 0.97 mmol of triisobutylaluminum were used in the first-stage polymerization of Example 1.

(2) Second-stage: Ethylene-α-olefin Random Copolymerization

The polymerization was carried out in the same manner as in Example 1 except that 20 ml of 1-hexene was used, the polymerization time was 90 minutes, the polymerization temperature was 40° C. and the ethylene gas pressure was 4.0 kgf/cm$^2$. Thus, 64.2 g of a propylene/ethylene-1-hexene block copolymer was obtained. The intrinsic viscosity [η] of the resulting block copolymer was 1.12 dl/g and Mw/Mn thereof was 2.1. The intrinsic viscosity [η] of the polypropylene component was 1.03 dl/g and Mw/Mn thereof was 2.0. The content of the ethylene-α-olefin random copolymer component was 31.7% by weight and the content of 1-hexene in the component was 13.3 mol % and, furthermore, the ρ value was 1.28. By the measurement of $^{13}$C-NMR, a signal derived from an ethylene-propylene chain [EP] was detected in the block copolymer, and 7.6 mol % of it was contained.

Evaluation of Physical Properties

The density of a pressed sheet of the block copolymer obtained was 0.884 g/cm$^3$ and the flexural modulus was 6100 Kg/cm$^2$. Furthermore, the Izod impact was 4.7 Kg·cm/cm$^2$ at 23° C. and was 3.1 Kg·cm/cm$^2$ at −20° C. MI (230° C.) was 53.3 g/10 minutes.

EXAMPLE 3

Polymerization (1) First-stage: Polymerization of Propylene

The polymerization was carried out in the same manner as in Example 1 except that 1.81 μmol of dimethylsilylbis(1-indenyl)hafnium dichloride and 0.90 mmol of triisobutylaluminum in the first-stage polymerization of Example 1 were used.

(2) Second-stage: Ethylene-α-olefin Random Copolymerization

The second-stage polymerization was carried out in the same manner as in Example 1 except that 35 ml of 1-hexene was used and the polymerization time was 90, the polymerization temperature was 30° C. and the ethylene gas pressure was 6.0 kgf/cm$^2$. Thus, 55.6 g of a propylene/ethylene-1-hexene block copolymer was obtained. The intrinsic viscosity [η] of the resulting block copolymer was 1.16 dl/g and Mw/Mn thereof was 2.3. The intrinsic viscosity [η] of the polypropylene component was 1.03 dl/g and Mw/Mn thereof was 2.1. The content of the ethylene-α-olefin random copolymer component was 42.7% by weight and the content of 1-hexene in the component was 19.2 mol % and, furthermore, the ρ value was 1.13. By the measurement of $^{13}$C-NMR, a signal derived from an ethylene-propylene chain [EP] was detected in the block copolymer, and 9.3 mol % of it was contained.

Evaluation of Physical Properties

The density of a pressed sheet of this block copolymer was 0.879g/cm$^3$ and the flexural modulus was 3700 Kg/cm$^2$. Furthermore, the Izod impact was 58.0 Kg·cm/cm$^2$ at 23° C. and was 10.9 Kg·cm/cm$^2$ at −20° C. MI (230° C.) was 34.9 g/10 minutes.

EXAMPLE 4

Polymerization (1) First-stage: Polymerization of Propylene

The First-stage polymerization was carried out in the same manner as in Example 1 except that 1.76 μmol of dimethylsilylbis (1-indenyl)hafnium dichloride and 0.88 mmol of triisobutylaluminum were used.

(2) Second-stage: Ethylene-α-olefin Random Copolymerization

The p Second-stage polymerization was carried out in the same manner as in Example 1 except that 20 ml of 1-octene was used and the polymerization time was 90 minutes, the polymerization temperature was 40° C., and the ethylene gas pressure was 4.0 kgf/cm$^2$. Thus, 51.8 g of a propylene/ethylene-1-octene block copolymer was obtained. The intrinsic viscosity [η] of the resulting block copolymer was 1.17 dl/g and Mw/Mn thereof was 2.4. The intrinsic viscosity [η] of the polypropylene component was 0.93 dl/g and Mw/Mn thereof was 2.6. The content of the ethylene-α-olefin random copolymer component was 44.4% by weight and the content of 1-octene in the component was 9.7 mol % and, furthermore, the ρ value was 1.14. By the measurement of $^{13}$C-NMR, a signal derived from an ethylene-propylene chain [EP] was detected in the block copolymer, and 11.4 mol % of it was contained.

Evaluation of Physical Properties

The density of a pressed sheet of this block copolymer was 0.879 g/cm$^3$ and the flexural modulus was 4700 Kg/cm$^2$. Furthermore, the Izod impact was 3.1 Kg·cm/cm$^2$ at 23° C. and was 3.3 Kg·cm/cm$^2$ at −20° C. MI (230° C.) was 57.8 g/10 minutes.

EXAMPLE 5

Polymerization
(1) First-stage: Polymerization of Propylene)

The first-stage polymerization was carried out in the same manner as in Example 1 except that 1.75 μmol of dimethylsilylbis(1-indenyl)hafnium dichloride and 0.87 mmol of triisobutylaluminum were used.
(2) Second-stage, Ethylene-α-olefin Random Copolymerization The second-stage polymerization was carried out in the same manner as in Example 1 except that 35 ml of 1-octene was used and the polymerization time was 90 minutes, the polymerization temperature was 40° C. and the ethylene gas pressure was 6.0 kgf/cm$^2$. Thus, 51.8 g of a propylene/ethylene-1-octene block copolymer was obtained. The intrinsic viscosity [η] of the resulting block copolymer was 1.37 dl/g and Mw/Mn thereof was 2.3. The intrinsic viscosity [η] of the polypropylene component was 1.00 dl/g and Mw/Mn thereof was 2.0. The content of the ethylene-α-olefin random copolymer component was 37.2% by weight and the content of 1-octene in the component was 11.2 mol % and, furthermore, the ρ value was 1.10. By the measurement of $^{13}$C-NMR, a signal derived from an ethylene-propylene chain [EP] was detected in the block copolymer, and 13.5 mol % of it was contained.
Evaluation of Physical Properties The density of a pressed sheet of this block copolymer was 0.879 g/cm$^3$ and the flexural modulus was 4500 Kg/cm$^2$. Furthermore, the Izod impact was 6.8 Kg·cm/cm$^2$ at 23° C. and was 5.0 Kg·cm/cm$^2$ at −20° C. MI (230° C.) was 46.0 g/10 minutes.

Comparative Example 1

Polymerization
(1) First-stage: Polymerization of Propylene

The first-stage polymerization was carried out in the same manner as in Example 1 except that 1.96 μmol of dimethylsilylbis(1-indenyl)hafnium dichloride and 0.98 mmol of triisobutylaluminum were used.
(2) Second-stage: Ethylene-α-olefin Random Copolymerization The first-stage polymerization was carried out in the same manner as in Example 1 except that an ethylene-propylene mixed gas having a propylene concentration of 30.3% by volume was fed at 3.0 kgf/cm$^2$ and the polymerization time was 60 minutes. Thus, 47.3 g of a propylene/ethylene-propylene block copolymer was obtained. The intrinsic viscosity [η] of the resulting block copolymer was 1.02 dl/g and Mw/Mn thereof was 2.1. The intrinsic viscosity [7 ] of the polypropylene component was 0.90 dl/g and Mw/Mn thereof was 2.1. The content of the ethylene-propylene random copolymer component was 37.6% by weight and the content of propylene in the component was 42.2 mol %.
Evaluation of Physical Properties The density of a pressed sheet of this block copolymer was 0.882 g/cm$^3$ and the flexural modulus was 6300 Kg/cm$^2$. Furthermore, the Izod impact was 2.6 Kg·cm/cm$^2$ at 23° C. and was 3.3 Kg·cm/cm$^2$ at −20° C. MI (230° C.) was 71.4 g/10 minutes.

Comparative Example 2

Polymerization
(1) First-stage: Polymerization of Propylene

After the inner atmosphere of a stirring type stainless steel autoclave (1 liter) was replaced with nitrogen, 280 ml of purified toluene and 200 ml of 1-hexene were charged and a hydrogen pressure of 50 mmHg was applied. Preparation for polymerization was conducted by saturating with an ethylene gas of 4.0 kgf/cm$^2$ with heating to a polymerization temperature of 60° C.

On the other hand, after the atmosphere of a flask (100 ml) equipped with a magnetic stirrer was replaced with nitrogen, 10 ml of purified toluene, 2.14 mmol of triisobutylaluminum and 4.27 μmol of dimethylsilylbis(1-indenyl)hafnium dichloride were added under a nitrogen atmosphere and then mixed with stirring at room temperature for 5 minutes. A molar ratio of [Al] to [Hf] of a catalyst solution prepared at this time was 500. This catalyst solution was allowed to penetrate in the autoclave using a propylene gas. After a purified toluene solution of triphenylcarbeniumtetrakis (pentafluorophenyl)borate (molar ratio of it to dimethylsilylbis(1-indenyl)hafnium dichloride: 1) was allowed to penetrate in the autoclave, the polymerization was conducted at 60° C. for 60 minutes. During the polymerization, the ethylene gas was continuously fed at 4.0 kgf/cm$^2$. Then, the polymerization was stopped by penetration of 10 ml of isobutanol. The unreacted monomer gas was purged and contents of the autoclave were introduced in an about 4-fold amount of ethanol. Then, the deposited polymer was filtered and dried at 60° C. for about 4 hours. As a result, 27.7 g of an ethylene-1-hexene random copolymer was obtained. This random copolymer was a rubber-like solid having a tackiness. The intrinsic viscosity [η] of the random copolymer was 1.30 dl/g and Mw/Mn thereof was 2.5. The content of 1-hexene was 19.6 mol % and the ρ value was 1.06. The density was 0.872 g/cm$^3$ and MI (190° C.) was 1.31 g/10 minutes.
Production of Polypropylene Composition and Evaluation of Physical Properties 70% by weight of polypropylene of Reference Example was dry-blended with 30% by weight of a rubber-like solid prepared by cutting the resulting ethylene-1-hexene random copolymer. Then, to 100 parts by weight of this blend, 0.2 part by weight of Sumilizer BHT, 0.05 part by weight of Irganox 1010 and 0.15 part by weight of calcium stearate were added. The resulting mixture was melt-kneaded under the conditions of a temperature of 180° C. and a revolution of 100 rpm for 5 minutes, using a portable twin-screw kneader, laboratory plastomill manufactured by Toyo Seiki Co., Ltd., and then cut into pieces to obtain pellets. The pellets were evaluated after press molding and conditioning according to JIS K6758. As a result, the density was 0.889 g/cm$^3$ and the flexural modulus was 6200 Kg/cm$^2$. Furthermore, the Izod impact was 8.6 Kg·cm/cm$^2$ at 23° C. and was 5.5 Kg·cm/cm$^2$ at −20° C. MI (230° C.) was 43.0 g/10 minutes.

Comparative Example 3

Ethylene-α-olefin Random Copolymerization

The polymerization was carried out in the same manner as in Comparative Example 2 except that 2.73 μmol of dimethylsilylbis(1-indenyl)hafnium dichloride and 1.37 mmol of triisobutylaluminum were used and 30 ml of 1-octene was added in place of 1-hexene in the polymerization of Comparative Example 2. As a result, 28.6 g of an ethylene-1-octene copolymer was obtained. This random copolymer was a rubber-like solid having a tackiness. The intrinsic viscosity [η] of the random copolymer was 1.27 dl/g and Mw/Mn thereof was 2.2. The content of 1-octene was 18.8 mol % and the ρ value was 0.99. The density was 0.865 g/cm$^3$ and MI (190° C.) was 3.4 g/10 minutes.

Production of Polypropylene Composition, Evaluation of Physical Properties

The polypropylene composition was produced in the same manner as in Comparative Example 2 except for using 60% by weight of polypropylene of Reference Example and 40% by weight of the resulting ethylene-1-octene random copolymer. The density of a pressed sheet of this polypropylene composition was 0.884 g/cm$^3$ and the flexural modulus was 4900 Kg/cm$^2$. Furthermore, the Izod impact was 5.2 Kg·cm/cm$^2$ at 23° C. and was 4.1 Kg·cm/cm$^2$ at −20° C. MI (230° C.) was 38.2 g/10 minutes.

EXAMPLE 6

Polymerization (1) First-stage: Polymerization of Propylene

Preparation for polymerization was conducted by replacing the atmosphere of a stirring type stainless steel autoclave (1 liter) with nitrogen, charging 300 ml of purified toluene and saturating with a propylene gas of 4.0 kgf/cm$^2$ with heating to a polymerization temperature of 40° C.

On the other hand, after the atmosphere of a flask (100 ml) equipped with a magnetic stirrer was replaced with nitrogen, 10 ml of toluene, 0.94 mmol of triisobutylaluminum and 1.88 μmol of dimethylsilylbis(1-indenyl)hafnium dichloride were added under a nitrogen atmosphere and then mixed with stirring at room temperature for 5 minutes. A molar ratio of [Al] to [Hf] of a catalyst solution prepared at this time was 500. This catalyst solution was allowed to penetrate in the autoclave using a propylene gas. After a purified-toluene solution of triphenylcarbeniumtetrakis (pentafluorophenyl)borate (molar ratio of it to dimethylsilylbis(1-indenyl)hafnium dichloride: 1) was allowed to penetrate in the autoclave, the polymerization was conducted at 40° C. for 20 minutes. During the polymerization, the propylene gas was continuously fed at 4.0 kgf/cm$^2$. The unreacted propylene gas was purged with stirring slowly and, after replacing the atmosphere with nitrogen, a small amount of the polymer was extracted. Furthermore, the pressure in the autoclave was reduced using a vacuum pump for about 1 minute.

(2) Second-stage: Ethylene-α-olefin Random Copolymerization

After 10 g of liquefied 1-butene was allowed to penetrate in the autoclave adjusted to 60° C., the polymerization was conducted at 60° C. for 5 hours with continuously feeding an ethylene gas at 4.0 kgf/cm$^2$. Then, the polymerization was stopped by penetration of 15 ml of isobutanol. The unreacted monomer gas was purged and contents of the autoclave were introduced in an about 4-fold amount of ethanol. Then, the deposited polymer was filtered and dried at 60 for about 4 hours. As a result, 52.2 g of a propylene/ethylene-butene block copolymer was obtained. The intrinsic viscosity [η] of the resulting block copolymer was 1.04 dl/g and Mw/Mn thereof was 2.7. The intrinsic viscosity [η] of the polypropylene component was 0.87 dl/g and Mw/Mn thereof was 2.2. The content of the ethylene-α-olefin random copolymer component was 50.4% by weight and the content of 1-butene in the component was 20.9 mol % and, furthermore, the ρ value was 1.31. By the measurement of $^{13}$C-NMR, a signal derived from an ethylene-propylene chain [EP] was detected in the block copolymer, and 14.6 mol % of it was contained.

Press Molding and Evaluation of Physical Properties

To 100 parts by weight of the resulting propylene/ethylene-butene block copolymer, 0.2 part by weight of Sumilizer BHT (trade name) (manufactured by Sumitomo Chemical Industries Co., Ltd., 2,6-di-t-butyl-p-cresol), 0.05 part by weight of Irganox 1010 (trade name) {manufactured by Ciba Geigy Limited. tetrakis[methylene-3-(3',5-di-t-butyl-4-hydroxyphenyl)propionate]methane} and 0.15 part by weight of calcium stearate were added. The resulting mixture was melt-kneaded under the conditions of a temperature of 180° C. and a revolution of 100 rpm for 5 minutes, using a Laboplastomill, a small-sized twin-screw kneader manufactured by Toyo Seiki Co., Ltd., and then cut into pieces to obtain pellets. The pellets hardly had a tackiness. The pellets were evaluated after press molding and conditioning according to JIS K6758. As a result, the density was 0.877 g/cm$^3$ and the flexural modulus was 1400 Kg/cm$^2$. In the Izod impact test at 23° C. and −20° C., both samples were not broken. MI (230° C.) was 53.7 g/10 minutes.

EXAMPLE 7

Polymerization (1) First-stage: Polymerization of Propylene

The first-stage polymerization was carried out in the same manner as in Example 6 except for using 1.98 μmol of dimethylsilylbis(1-indenyl)hafnium dichloride and 0.99 mmol of triisobutylaluminum.

(2) Second-stage: Ethylene-α-olefin Random Copolymerization

The second-stage polymerization was carried out in the same manner as in Example 6 except that 20 ml of 1-hexene was used and the polymerization temperature was 30° C. Thus, 44.4 g of a propylene/ethylene-1-hexene block copolymer was obtained. The intrinsic viscosity [η] of the resulting block copolymer was 1.38 dl/g and Mw/Mn thereof was 2.3. The intrinsic viscosity [η] of the polypropylene component was 0.82 dl/g and Mw/Mn thereof was 2.1. The content of the ethylene-α-olefin random copolymer component was 80.7% by weight and the content of 1-hexene in the component was 9.7 mol % and, furthermore, the ρ value was 1.06. By the measurement of $^{13}$C-NMR, a signal derived from an ethylenepropylene chain [EP] was detected in the block copolymer, and 24.9 mol % of it was contained.

Evaluation of Physical Properties

Pellets obtained from this block copolymer hardly had a tackiness and the density of a pressed sheet of this block copolymer was 0.860 g/cm$^3$. It was impossible to measure the flexural modulus. In the Izod impact test at 23° C. and −20° C., both samples were not broken. MI (230° C.) was 6.8 g/10 minutes.

EXAMPLE 8

Polymerization (1) First-stage: Polymerization of Propylene

The first-stage polymerization was carried out in the same manner as in Example 6 except for using 1.79 μmol of dimethylsilylbis(1-indenyl)hafnium dichloride and 0.90 mmol of triisobutylaluminum.

(2) Second-stage, Ethylene-α-olefin Random Copolymerization

The second-stage polymerization was carried out in the same manner as in Example 6 except that 20 ml of 1-octene was used and the polymerization temperature was 40° C. Thus, 62.8 g of a propylene/ethylene-1-octene block copolymer was obtained. The intrinsic viscosity [η] of the resulting block copolymer was 1.14 dl/g and Mw/Mn thereof was 2.5. The intrinsic viscosity [η] of the polypropylene component was 1.29 dl/g and Mw/Mn thereof was 3.0. The content of the ethylene-α-olefin random copolymer component was 69.9% by weight and the content of 1-octene in the component was 10.8 mol % and, furthermore, the ρ value was 1.20. By the measurement of $^{13}$C-NMR, a signal derived from an ethylenepropylene chain [EP] was detected in the block copolymer, and 24.2 mol % of it was contained.

Evaluation of Physical Properties

Pellets obtained from this block copolymer hardly had a tackiness and the density of a pressed sheet was 0.866 g/cm$^3$. It was impossible to measure the flexural modulus. In the Izod impact test at 23° C. and −20° C., both samples were not broken. MI (230° C.) was 41.9 g/10 minutes.

Comparative Example 4

Polymerization

After the atmosphere of a stirring type stainless steel autoclave (1 liter) was replaced with nitrogen, 300 ml of purified toluene was charged. Then, 10 g of liquefied 1-butene was charged. Preparation for polymerization was conducted by saturating with an ethylene gas of 4.0 kgf/cm$^2$ with heating to a polymerization temperature of 60° C.

On the other hand, after the atmosphere of a flask (100 ml) equipped with a magnetic stirrer was replaced with nitrogen, 10 ml of purified toluene, 1.36 mmol of triisobutylaluminum and 2.73 μmol of dimethylsilylbis(1-indenyl)hafnium dichloride were added under a nitrogen atmosphere and then mixed with stirring at room temperature for 5 minutes. A molar ratio of [Al] to [Hf] of a catalyst solution prepared at this time was 500. This catalyst solution was allowed to penetrate in the autoclave using a propylene gas. After a purified toluene solution of triphenylcarbeniumtetrakis (pentafluorophenyl)borate (molar ratio of it to dimethylsilylbis(1-indenyl)hafnium dichloride: 1) was allowed to penetrate in the autoclave, the polymerization was conducted at 60° C. for 1 hour. During the polymerization, the ethylene gas was continuously fed at 4.0 kgf/cm$^2$. Then, the polymerization was stopped by penetration of 15 ml of isobutanol. The unreacted monomer gas was purged and contents of the autoclave were introduced in an about 4-fold amount of ethanol. Then, the deposited polymer was filtered and dried at 60° C. for about 4 hours. As a result, 20.7 g of an ethylene-butene random copolymer was obtained. The intrinsic viscosity [η] of the random copolymer was 1.83 dl/g and Mw/Mn thereof was 2.5. The content of 1-butene was 21.2 mol % and the ρ value was 1.11. The density was 0.875 g/cm$^3$ and MI (190° C.) was 0.41 g/10 minutes. This random copolymer has a tackiness and molding thereof was difficult.

Comparative Example 5

Polymerization

After the atmosphere of a stirring type stainless steel autoclave (3 liter) was replaced with nitrogen, 1000 ml of purified toluene was charged and a hydrogen pressure of 50 mmHg was applied. Preparation for polymerization was conducted by saturating with an ethylene gas of 4.0 kgf/cm$^2$ with heating to a polymerization temperature of 60° C.

On the other hand, after the atmosphere of a flask (100 ml) equipped with a magnetic stirrer was replaced with nitrogen, 10 ml of toluene, 6.35 mmol of triisobutylaluminum and 12.7 μmol of dimethylsilylbis(1-indenyl)hafnium dichloride were added under a nitrogen atmosphere and then mixed with stirring at room temperature for 5 minutes. A molar ratio of [Al] to [Hf] of a catalyst solution prepared at this time was 500. This catalyst solution was charged in the autoclave with a propylene gas pressure. After a purified toluene solution of triphenylcarbeniumtetrakis (pentafluorophenyl)borate (molar ratio of it to dimethylsilylbis(1-indenyl)hafnium dichloride: 1) was allowed to penetrate in the autoclave, the polymerization was carried out at 40° C. for 3 hours. During the polymerization, the propylene gas was continuously fed at 4.0 kgf/cm$^2$. Then, the polymerization was terminated by penetration of 15 ml of isobutanol. The unreacted monomer gas was purged and contents of the autoclave were introduced in an about 4-fold amount of ethanol. Then, the deposited polymer was filtered and dried at 60° C. for about 4 hours. As a result, 253.0 g of polypropylene was obtained. The intrinsic viscosity [η] of this polypropylene was 1.06 dl/g and Mw/Mn thereof was 2.2. The stereoregularity mmmm fraction was 0.904 and the melting point was 143.8° C.

Evaluation of Physical Properties

The density of a pressed sheet of this polypropylene was 0.900 g/cm$^3$ and the flexural modulus was 13600 Kg/cm$^2$. Furthermore, the Izod impact was 1.8 Kg·cm/cm$^2$ at 23° C. and was 2.1 Kg·cm/cm$^2$ at −20° C. MI (230° C.) was 77.1 g/10 minutes.

According to the present invention, there can be provided an olefin block copolymer superior in impact resistance, and a process for producing the same. When an amount of a polypropylene component is within the range from 50 to 95% by weight, there can be provided an olefin block copolymer superior in balance between the impact resistance and rigidity without blending a rubber-like copolymer having large randomness and narrow composition distribution. On the other hand, when the amount of the polypropylene is particularly not less than 5% by weight and less than 50% by weight, there can be provided a heat-resistant olefin block copolymer having better processability. This olefin block copolymer has a marked effect for improving physical properties of propylene, and can be efficiently produced and handled compared with a conventional polyolefin copolymer rubber.

What is claimed is:

1. A propylene/ethylene-α-olefin block copolymer obtained by polymerizing propylene in the presence of a catalyst comprising a combination of (A) a stereorigid chiral compound of zirconium or hafnium, having a cyclopentadienyl ring and (B) at least one member selected from the group consisting of (i) aluminoxanes, (ii) compounds which react with the transition metal compound to form a stable anion and (iii) organoaluminum compounds, as essential components in the first-stage to produce a polypropylene component; and then copolymerizing ethylene, an α-olefin selected from the group consisting of 1-butene, 1-hexene and 1-octene and optionally propylene in a second-stage in the presence of the polypropylene component formed in the first-stage to obtain a random copolymer component, which satisfies (I) to (II):

(I) the content of the polypropylene component having an intrinsic viscosity [(η)] measured in tetralin at 135° C. of from 0.5 to 5.0 dl/g is from 5 to 95% by weight;

(II) the content of the α-olefin in the random copolymer component is from 5 to 40 mol %, and the content of the ethylene α-olefin random copolymer component having a ρ value represented by the following equation:

$$\rho = 2[E][A]/[EA]$$

wherein [E] represents a molar fraction of ethylene, [A] represents a molar fraction of the α olefin and [EA] represents a molar fraction of a dyad chain of ethylene and the α-olefin within the range from 0.5 to 1.5 is from 5 to 95% by weight; and (III) the intrinsic viscosity ([η]) of the propylene/ethylene-α-olefin block copolymer measured in tetralin at 135° C. is from 0.5 to 5.0 dl/g and the propylene content in the random copolymer block is not more than 3% by weight.

2. A propylene/ethylene-α-olefin block copolymer according to claim 1, wherein the intrinsic viscosity of the polypropylene component is from 0.5 to 3.0 dl/g.

3. A propylene/ethylene-α-olefin block copolymer according to claim 1, wherein the α-olefin is 1-butene.

4. A propylene/ethylene-α-olefin block copolymer according to claim 1, wherein the α-olefin is 1-hexene.

5. A propylene/ethylene-α-olefin block copolymer according to claim 1, wherein the α-olefin is 1-octene.

6. A molded article obtained by molding the propylene/ethylene-α-olefin block copolymer of claim 1.

7. A propylene/ethylene-α-olefin block copolymer obtained by polymerizing propylene in the presence of a catalyst comprising a combination of (A) a transition metal compound of Group IV of the periodic table which has a cyclopentadienyl ring and (B) at least one selected from the group consisting of (i) aluminoxane, (ii) a compound which reacts with the transition metal compound to form a stable anion and (iii) an organoaluminum compound, as essential components in the first-stage to produce a polypropylene component;

then copolymerizing ethylene, an α-olefin selected from the group consisting of 1-butene, 1-hexene and 1-octene and optionally propylene in a second-stage in the presence of the polypropylene component formed in the first-stage to obtain a random copolymer component, which satisfies (I) to (III):

(I) the content of the polypropylene component having an intrinsic viscosity ([η]) measured in tetralin at 135° C. of from 0.5 to 5.0 dl/g is from 5 to 95% by weight;

(II) the content of the α-olefin in the random copolymer component is from 5 to 40 mol %, and the content of the ethylene-α-olefin random copolymer component having a ρ value represented by the following equation:

$$\rho = 2[E][A]/[EA]$$

wherein [E] represents a molar fraction of ethylene, [A] represents a molar fraction of the α-olefin and [EA] represents a molar fraction of a dyad chain of ethylene and the α-olefin within the range from 0.5 to 1.5 is from 5 to 95% by weight; and (III) the intrinsic viscosity ([η]) of the propylene/ethylene-α-olefin block copolymer measured in tetralin at 135° C. is from 0.5 to 5.0 dl/g and the propylene content in the random copolymer block is not more than 3% by weight.

* * * * *